UNITED STATES PATENT OFFICE.

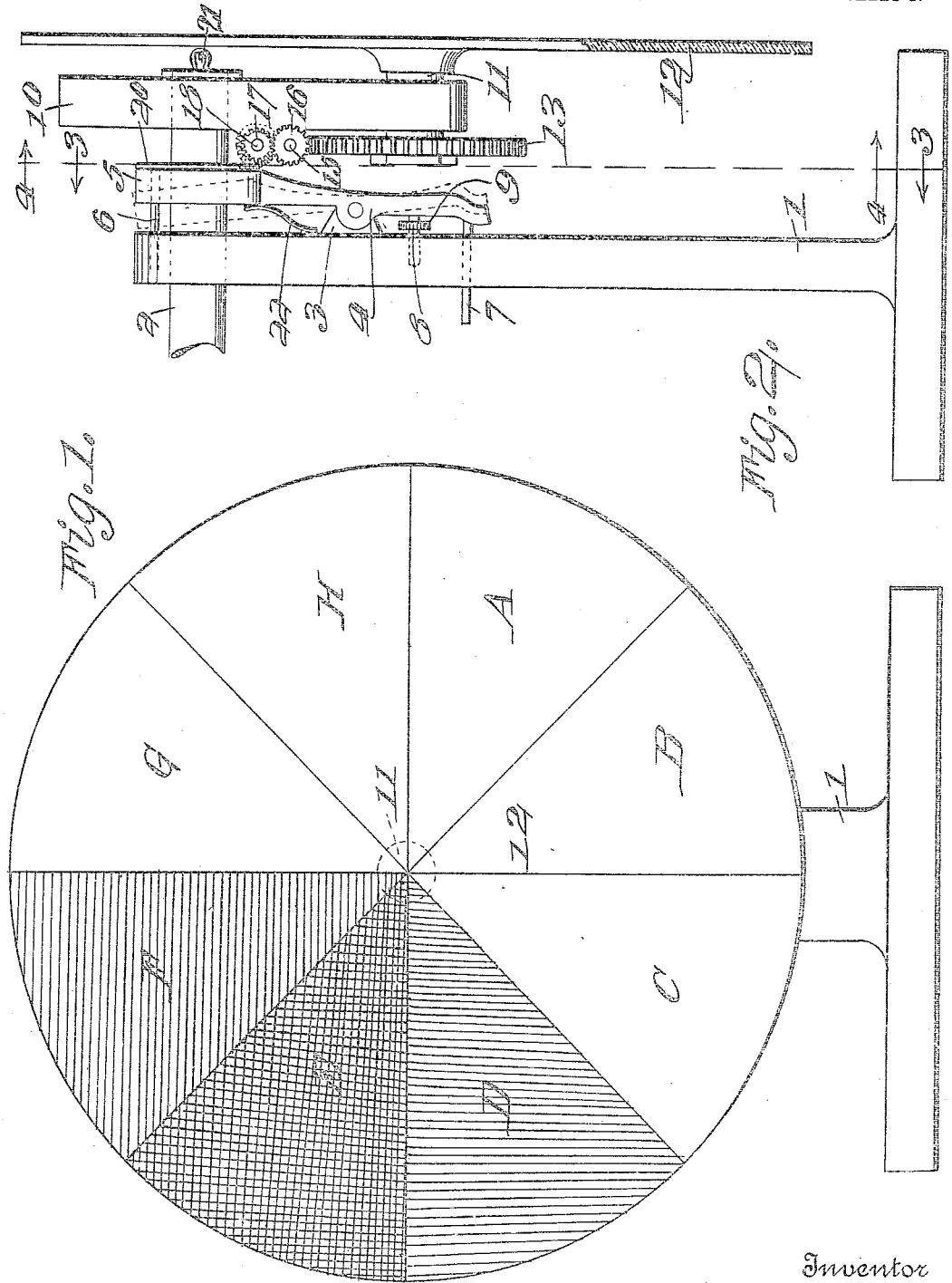

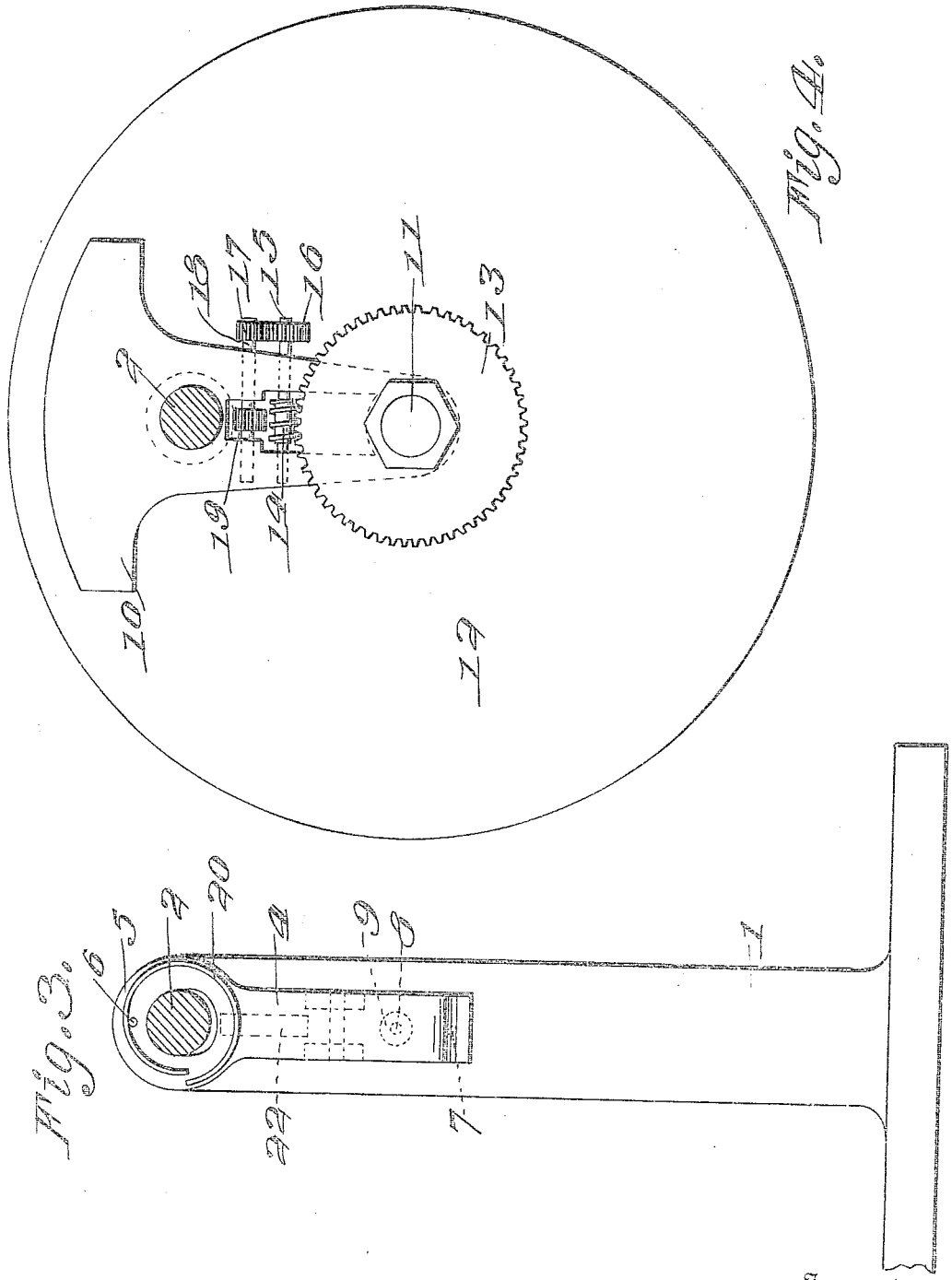

GLEN FLEAK, OF TERLTON, OKLAHOMA, ASSIGNOR OF ONE-HALF TO A. G. SECHRIST, OF LAWTON, OKLAHOMA.

ADVERTISING DEVICE.

953,824. Specification of Letters Patent. Patented Apr. 5, 1910.

Application filed October 15, 1908. Serial No. 457,888.

*To all whom it may concern:*

Be it known that I, GLEN FLEAK, a citizen of the United States, residing at Terlton, in the county of Pawnee and State of Oklahoma, have invented certain new and useful Improvements in Advertising Devices; and I do declare the following to be a full, clear, and exact description of the invention, such as will enable others skilled in the art to which it appertains to make and use the same.

This invention relates to improvements in advertising devices and has for its object the production of a mechanism for rotating a multicolored disk upon its own axis, and with a planetary motion around another axis.

The invention comprises the construction of an advertising device provided with a rotatable disk mounted upon a crank which is adapted to rotate around a shaft in fixed position, and which is provided with suitable gearing for transmitting motion from said shaft to the disk, whereby the disk rotates on its own axis and revolves around the driving shaft.

One of the objects of the invention is the production of an advertising device having a rotatable transparent disk and provided with means for rotating the disk around its own axis and revolving the same around the drive shaft, and means for illuminating the disk supported on the drive shaft.

With these and other objects in view, the invention consists of certain novel features of construction, combination and arrangement of parts as will be described and particularly pointed out in the appended claims.

In the accompanying drawing, Figure 1 is a front elevation; Fig. 2 is a side elevation; Fig. 3 is a vertical sectional view taken on the line 3—3 of Fig. 2, looking in the direction of the arrow and Fig. 4 is a rear elevation.

In the accompanying drawings, which are for illustrative purposes and accordingly not drawn to scale, 1 denotes a supporting standard which is provided at its upper end with a bearing through which a drive shaft, 2, extends on a horizontal plane. The standard, 1, is formed with a lateral projection, 3, and a lever, 4, is pivotally supported on the projection, 3, and is formed at its upper end with a loop portion, 5, which embraces the shaft, 2, and is provided with laterally projecting pins, 6 and 7, which are adapted to project through the standard 1. The pin, 6, is secured on the upper end of the lever, 4, and tends to prevent said lever from rotating with the shaft, 2, and the pin 7 is secured on the lower end of said lever and is arranged to project a slight distance beyond the standard, 1. The lower end of the lever engages an adjusting screw, 8, which is provided with an operating nut, 9, and extends laterally from the standard, 1. The shaft, 2, carries a crank, 10, which is adapted to revolve thereon, and said crank carries a second shaft, 11, on which is mounted a multicolored disk, 12. The shaft 11 projects through one end of the crank, 10, with which it is adapted to rotate and is provided at its rear end with a gear, 13, which is adapted to engage with a worm, 14, carried by a shaft 15 which is journaled on the crank, 10. The shaft, 15, is provided with a pinion, 16, which engages a small pinion, 17, carried by a shaft, 18, which is journaled in like manner with the shaft, 15. The shaft, 18, is provided with a worm gear, 19, which gear is adapted to receive motion from a spiral gear, 20, which surrounds the shaft, 2, and is mounted on the loop end 5 of the lever, 4.

The multicolored disk 12 is formed with a series of colored divisions, A, B, C, D, E, F, G and H, which may respectively represent red, black, green, yellow, orange, brown, purple and blue.

The shaft 2 is adapted to receive motion from a suitable machine which may be positioned around the same, and is preferably provided with a lamp, 21, which is adapted to project its rays against the rear side of the multicolored disk, 12, which is preferably formed of transparent material. When the shaft, 2, is caused to revolve, motion will be transmitted to the worm gear, 19, and from said worm gear by the shaft 18 and pinion, 17, to the pinion, 16, and shaft, 15, and from said shaft and pinion by the worm 14 to the large gear, 13, which is rigidly mounted upon the disk-carrying shaft, 11. The rotation of the shaft, 2, will therefore cause the multicolored disk, 12, to rotate on the shaft, 11, and to be carried by the crank, 10, around the axis of the shaft, 2, consequently, giving said multicolored disk a movement of its own around its own axis, and a movement around the axis of the drive shaft, 2. This double movement of the multicolored disk 12 will cause the colors carried by the disk 12 to apparently merge with one another and produce a composite effect. While the disk, 12, is rotating around its own axis and revolving around the axis of the drive shaft, 2, its rotation around its own axis may be stopped by forcing the pins, 7, inwardly, thereby bringing the spiral, 20, out of engagement with the worm gear 19. The spiral, 20, is held in normal engagement with the worm gear, 19, by means of a curved spring, 22, which is adapted to bear against the rear side of the lever, 4. A part of the multicolored disk 12 may be covered should the same be desired, or the whole may be exposed to view and by successively manipulating the lever 4 so that said disk will be stopped, different designs may be made to appear. By suitably operating the device and varying the speed of the disk 12, the blending of the colors on said disk will be such that many different and beautiful designs approaching a geometrical character will be produced.

From the foregoing description, taken in connection with the accompanying drawing, the construction and operation of the invention may be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. An advertising device comprising a pivotally mounted multicolored disk, means for causing said disk to rotate about an axis independent of its own, means comprising in part the said means for simultaneously rotating the disk on its own axis, and means to stop the rotation of the disk about its own axis.

2. An advertising device comprising a pivotally mounted transparent multicolored disk, means for causing said disk to revolve about an axis independent of its own, means comprising in part the said means for simultaneously rotating the disk on its own axis, and means to stop the rotation of the disk about its own axis.

3. An advertising device comprising a pivotally mounted multicolored disk, means for causing said disk to revolve about an axis independent of its own, means comprising in part the said means for simultaneously rotating the disk on its own axis, means to stop the rotation of the disk, about its own axis, and means carried by the revolving means to illuminate the disk.

4. An advertising device comprising a pivotally mounted transparent multicolored disk, a rotating shaft, a crank keyed to the shaft and supporting said disk, a standard to support the shaft, means carried by the standard and by the crank for causing the disk to rotate about its own axis when the shaft is rotated, and means to stop the rotation of the disk about its own axis.

5. An advertising device comprising a pivotally mounted multicolored transparent disk, a shaft for the disk, a crank for supporting the shaft, a drive shaft for the crank, illuminating means mounted on the drive shaft behind the disk, means actuated by the rotation of the drive shaft to rotate the disk on its own axis, said crank simultaneously moving the disk around the axis of the drive shaft, and means for stopping the rotation of the disk on its own axis.

6. An advertising device comprising a standard, a shaft journaled on the standard, a crank carried by the shaft, a multicolored rotatable disk carried by the crank, gear mechanism connected to the disk, a lever pivotally supported on the standard and loosely embracing the shaft, a spiral gear formed on the lever and surrounding the shaft and arranged to engage with the gear mechanism to rotate the disk, and means for throwing the lever out of engagement with the gear mechanism.

7. An advertising device comprising supporting means, a rotating drive shaft journaled on the supporting means, a lever pivotally mounted on the supporting means and having a portion loosely surrounding the shaft, a spiral gear carried by the lever and surrounding the shaft, a crank carried by the drive shaft, a transparent multicolored disk carried by the crank, gear mechanism arranged to engage the spiral gear and rotate the disk about its own axis simultaneously with its rotation with the shaft, means to insure the proper engagement of the spiral gear with the gear mechanism, and means to throw the spiral gear out of engagement with the gear mechanism.

8. An advertising device comprising a standard, a shaft supported on the upper end of the standard, a crank carried by the standard, a disk rotatably supported on one end of the crank, a lever pivotally connected with the standard and having its upper end loosely embracing the shaft so as to be capable of forward and rearward movement thereon, a pin secured to the lower end of the lever and slidably extending through the standard, a spiral gear formed on said upper end of the lever and surrounding the shaft, gear mechanism for connecting the spiral gear with the disk and means for holding the spiral gear normally in engagement with the gear mechanism.

9. An advertising device comprising a standard, a shaft supported on the upper end of the standard, a lever pivotally secured to the standard and formed with a loop portion at its upper end through which the shaft is adapted to project, a pin formed on the upper end of the lever and slidably extending through the standard for holding the same in a fixed position relative thereto, an operating pin formed on the lower end of the lever and adapted to slidably project through the standard, a crank mounted on the shaft, a disk rotatably supported on the crank, gear mechanism connected with the disk and carried by the crank, a spiral gear arranged on the loop portion of the lever and adapted to engage with the gear mechanism, and means for holding the spiral gear normally in engagement with said mechanism.

10. An advertising device comprising a standard, a shaft supported on the upper end of the standard, a crank mounted on the outer end of the shaft, a multi-colored disk rotatably supported on one end of the crank, a gear connected with the multi-colored disk, a lever formed with a loop portion at its upper end adapted to embrace the shaft and pivotally supported on the standard whereby the loop portion is capable of forward and rearward movement on the shaft, a pin adapted to slidably project through the standard secured to the lower end of the lever, a second pin adapted to slidably project through the standard and secured to the upper end of the lever for holding the lever in a fixed position relative to said standard, a spiral gear formed on the loop portion of the lever, gears for connecting the spiral gear with the gear connected with the disk, means for holding the spiral gear normally in engagement with the gears, means for adjusting the lever relative to the standard and illuminating means arranged on the outer ends of the shaft adapted to project light rays against the multi-colored disk.

In testimony whereof I have hereunto set my hand in presence of two subscribing witnesses.

GLEN FLEAK.

Witnesses:
T. B. PERKINS,
J. MARTIN HAYDEN.